2,858,277

2,858,277
REVIVIFYING CATION EXCHANGE MATERIALS

Edward A. Hunter, Baton Rouge, La., assignor to Esso Research and Engineering Company, a corporation of Delaware No Drawing. Application October 22, 1953
Serial No. 387,799

4 Claims. (Cl. 252—313)

This invention relates to an improved process for the preparation of substantially pure silica hydrosols by using cation exchange materials.

It is known to produce silica hydrosols by passing dilute sodium silicate solutions in contact with cation exchange materials. In the prior art processes, a maximum product hydrosol concentration of about 3 wt. percent $SiO_2$ has been limiting, the use of greater concentrations resulting in serious deactivation of the exchange resin. Using such greater concentrations markedly decreases the exchange capacity and/or exchange rate of the resin by fouling the resin and making it necessary to operate the system at a lower rate and likewise to regenerate the resin more frequently during production of a given amount of hydrosol. In addition, the relatively expensive exchange material must be replaced more frequently due to the deactivation.

According to the present invention the loss of exchange capacity of the cation exchange material or fouling of the cation exchange resin can be corrected by periodically treating the cation exchange material with a solution of alkali metal hydroxide, preferably caustic soda, preferably at a temperature of about 110° to 180° F. The used caustic or alkali solution, containing some dissolved $SiO_2$ may be diverted to the sodium silicate manufacturing facilities to recover most of the value of the caustic and dissolved silica. By using the present invention the useful life of the exchange resin is extended or prolonged.

More particularly according to this invention substantially pure silica hydrosols containing about 3 to 8 wt. percent $SiO_2$ are made by contacting a sodium silicate solution or other alkali metal silicate solution with an acid regenerated cation exchange material such as granular exchange resin in order to effect substantially complete removal of the sodium ion. The exchange material may be used as a stationary bed or column or in any other way using ion exchange techniques well known in the art. The effluent from the exchange resin is a substantially pure silica hydrosol. If the silica content of the effluent hydrosol is compared with the charged silicate solution it will be found that from about 5 to 15 percent of siliceous material calculated as silica has been retained on the resin. The amount and nature of siliceous material or deposit deposited depends upon the concentration of the silicate solution, the temperature at which the process is carried out, the rate of percolating the silicate through the resin, and similar factors. It is this retained siliceous material which forms the deposit which must be removed from the resin to retain the exchange capacity of the resin. While this deposit is believed to be a siliceous deposit, the nature of the deposit is not known. It was found that caustic soda would revivify such a fouled resin under certain conditions. It was further found that some deposits where different in nature from others and required higher temperatures for removal of the deposits.

When using sodium hydroxide as the reactivating agent the concentration of the sodium hydroxide solution may be between about 5 and 15% by weight, the amount of sodium hydroxide solution used may be between about 50 and 200 percent by weight of the cation exchange resin and the temperature of the sodium hydroxide solution used for treating may be between about 110° F. and 180° F., preferably between about 165° F. and 180° F. Instead of sodium hydroxide, other alkali metal hydroxides, including ammonium hydroxide, may be used. However, sodium hydroxide is preferred because it is cheaper and more effective.

The silica hydrosol made according to the present invention may be allowed to gel and then dried and used as such without washing, or the silica hydrosol may be used in admixture with alumina hydrosol, set to a hydrogel and dried or spray dried to make a silica-alumina cracking catalyst. It is not necessary to wash the silica gel formed from the silica hydrosol made by the present process since it is essentially free of impurities. The alumina hydrosol may be made from an aluminum alcoholate as a starting product or may be made by processes well known in the art such as treating aluminum with acetic acid. One such method is disclosed in copending case of Hunter et al., Serial No. 214,158, filed March 6, 1951, now U. S. Patent No. 2,656,321, granted October 20, 1953. Or aluminum alcoholate may be hydrolyzed with water to form an alumina slurry and the alumina peptized with acetic acid to an alumina hydrosol. Or the silica hydrosol or gel may be mixed with other metal oxides to form cracking or other catalysts such as silica-magnesia, silica-alumina-magnesia, silica-zirconia, silica-zirconia-alumina, etc.

As the exchange material it is preferable to use a resin cation exchange material of the acid regenerated type. Such cation exchange resins are available as commercial products. The exchange resins are obtained by condensing aldehydes such as formaldehyde with phenols or with phenol-sulfonic acids or with phenol-carboxylic acids or the like. Other exchange materials which may be used are sulfuric acid treated coal or wood or waste petroleum sludge or lignite or the like. Also the sulfonated polystyrene type cation exchange resin may be used. These exchange materials are treated with an acid such as sulfuric acid or the like to put them in the hydrogen cycle for use in removing cations or sodium in this particular case. Exchange resins of this type are sold by Resinous Products and Chemical Company under the name of Amberlite.

After a resin exchanger has been in use preparing a hydrosol of greater than about 3% by weight $SiO_2$ for a period of time, depending on the resin employed, it is found that the exchange capacity has decreased, that is, that sodium ions begin to pass through the resin in amounts in excess of that which may be tolerated in a substantially pure silica hydrosol indicating that the resin must be acid-regenerated before further use. This need for regeneration may be detected either by soda analysis of the effluent hydrosol, or preferably by the rise in pH of the hydrosol when soda leakage becomes serious. Using the sodium silicates of commerce, a pH of about 4.0 or higher indicates that the resin requires regeneration.

A column of resin which requires regeneration is first washed with water to remove silica hydrosol and soluble material, then regenerated by contacting with an acid such as sulfuric acid or hydrochloric acid or the like to replace the alkali metal ions adsorbed thereon with hydrogen ions with the formation of sodium sulfate or sodium chloride depending on the acid used in the regeneration. The column of resin is then washed with water until the effluent tests free of sulfate or chloride ion. The resin is then ready for another cation exchange step or operation. The resin is washed for about 20 minutes at a rate of about 0.05 cc./min./gm. of resin. In the regeneration step the resin is treated with about 150% of the $H_2SO_4$ theoretically equivalent to the adsorbed sodium ions as a 5% aqueous solution at a rate of about 0.03 cc./min./gm. of resin. The regenerated resin is then washed with water at a rate of about 0.05 cc./min./gm. of resin until the effluent liquid tests free of sulfate ion to a 10% barium chloride solution While a specific sodium silicate is given in the following examples it is to be understood that other sodium silicates may be used. Also other alkali metal silicates may be used. The concentration of the sodium silicate solution should be such that there are not more than about 150 g. of $SiO_2$ per liter and preferably not more than 80 g. of $SiO_2$ per liter.

The rate of flow of the sodium silicate solution through the bed of exchange resin may vary between about 0.01 cc. and 0.2 cc. per minute per gm. of resin preferably about 0.05 cc. per minute per gm. of resin.

The following examples are illustrative of the invention. In these examples, well known Amberlite IR-120 cation exchange resin was used and this resin is believed to be a polystyrene resin nuclearly substituted with sulfonic acid groups and is of the general type described in D'Alelio Patent No. 2,366,007.

EXAMPLE 1

A 4" diameter bed of about 3.5 liters or about 2700 gm. of granular Amberlite resin IR-120 (sulfonated polystyrene cation exchange resin) having a particle size between about 400 and 600 microns which had been employed as a substantially stationary column for something over 50 exchange-regeneration cycles in the preparation of 5 weight percent silica hydrosol, by contacting a solution of sodium silicate, $Na_2O \cdot 3.25SiO_2$, of the appropriate concentration with the bed of resin in the acid cycle, was found to have lost a large measure of its exchange capacity. That is, after successive regenerations by the conventional procedure of contacting with dilute sulfuric acid, it was found that progressively smaller volumes of the sodium silicate solution could be passed over the resin bed before sodium ion breakthrough or rising pH of the effluent indicated exhaustion of the exchange capacity.

Two liters of 10% aqueous NaOH solution were heated to about 175° F. and contacted with the resin bed for 10 minutes. The bed was then drained, washed about 20 minutes with about 0.05 cc./min./gm. resin of distilled water, regenerated to the acid cycle with about 150% of the $H_2SO_4$ equivalent to the theoretical soda capacity of the resin at about 0.05 cc./min./gm. of resin and put back into normal service. As a result of this treatment, while the resin suffered a shrinkage of about 30 volume percent, the exchange capacity was revived to approximately its original level. The resin swelled back to approximately its original volume after two or three exchange cycles following the caustic treat.

This revivified resin bed was employed in a total of 18 cation exchange-regeneration cycles for treating sodium silicate to form silica hydrosol as described above without further signs of activity loss, before the run was voluntarily terminated.

EXAMPLE 2

A 4" diameter column of Amberlite resin IR-120 (sulfonated polystyrene cation exchange resin) was employed for 7 exchange-regeneration cycles contacting a solution of $Na_2O \cdot 3.25SiO_2$, sp. g. 107, to yield a silica sol effluent containing nominally 7 weight percent silica (5.75% $SiO_2$ by analysis).

After these 7 cycles the resin in the column was aggregated into lumps which did not break up on washing. The exchange capacity of the resin had dropped to about 50% of fresh resin.

The resin was held overnight under water and was then thoroughly mixed, put through a 6 mesh screen, and again thoroughly mixed.

One kilogram aliquots of the resin were then given the following treatments in an effort to clean up the resin and restore exchange capacity.

(1) One kilogram of resin was put into a column and back-washed for 30 minutes at 50% bed expansion with distilled water at room temperature.

Treated resin analyzed 4.70% $SiO_2$.

(2) One kilogram resin was washed 6 times by decantation with 1500 cc. portions of distilled water at 200° F.

Treated resin analyzed 4.35% $SiO_2$.

(3) One kilogram resin was washed twice by decantation with 1500 cc. portions of distilled water at room temperature. The resin was then treated for 15 minutes with 500 cc. of 10% NaOH solution at room temperature. The treated resin was washed twice by decantation with 1500 cc. portions of distilled water at room temperature.

Treated resin analyzed 3.5% $SiO_2$.

(4) One kilogram resin was washed twice by decantation with 1500 cc. portions of distilled water at room temperature. The resin was then treated for 15 minutes with 500 cc. of 10% NaOH solution at 165° F. The treated resin was then washed twice by decantation with 1500 cc. portions of distilled water at room temperature.

Treated resin analyzed 0.35% $SiO_2$.

Example 2 shows that hot caustic removes the siliceous deposit quite efficiently from the resin and demonstrates that with certain siliceous deposits higher temperatures than room temperature are necessary to remove such deposits for reactivating the resin.

EXAMPLE 3

In the laboratory a 4" diameter glass tube containing about 4000 cc. of Amberlite resin, IR-120 (sulfonated polystyrene cation exchange resin) was used to remove the soda from about 4250 cc. of a dilute (1.07 spr. gr.) sodium silicate ($Na_2O \cdot 3.25SiO_2$) solution to produce a silica sol containing nominally 7 wt. percent $SiO_2$. Following this operation the cation exchange resin was washed with distilled water for about 20 minutes at a rate of about 0.05 cc./min./gm. of resin, then treated with about 5% aqueous $H_2SO_4$ (150% of theoretical soda capacity) at a rate of about 0.03 cc./min./gm. of resin to regenerate the resin, washed again for about 20 minutes at a rate of about 0.05 cc./min./gm. of resin and the exchange step repeated. This process was carried through for a total of eight soda removal cycles at which time the capacity of the resin for soda had decreased about 35% because of fouling of the resin. The spent resin was then treated with about 4250 cc. of 5% sodium hydroxide for about 10 minutes at 100° F., washed with distilled water for about 20 minutes at a rate of about 0.05 cc./min./gm. of resin and then regenerated with dilute sulfuric acid as described above.

After this treatment it was found the soda capacity of the resin had returned to normal. The following data show the effectiveness of this method over a number of cycles.

*Revivification of spent Amberlite Resin IR–120 (sulfonated polystyrene-cation exchange resin) using 5% NaOH solution at 110° F.*

| Resin | Efficiency—Percent Fresh Amberlite IR-120 |
|---|---|
| Fresh | 100. |
| 8 exchange cycles | Less than about 65. |
| After 1st NaOH treat | 135. |
| 8 exchange cycles | Less than about 65. |
| After 2nd NaOH treat | 116. |
| 8 exchange cycles | Less than about 65. |
| After 3rd NaOH treat | 101. |
| 8 exchange cycles | Less than about 65. |
| After 4th NaOH [1] treat | 100.[2] |

[1] About 570 cc. fresh Amberlite IR-120 added to make up to original volume of resin.
[2] Run still in progress.

In the above data each of the 8 exchange cycles comprises an exchange step, a water washing step, an acid regeneration step and a water washing step. Following each NaOH treat the resin was again washed with water, treated with acid to put the resin in the hydrogen cycle and again water washed and the resin was then used in an exchange step to determine the efficiency.

This case is filed as a continuation-in-part of the Hunter application Serial No. 237,287, filed July 17, 1951, now abandoned.

What is claimed is:

1. A method of producing silica hydrosol of more than 3% $SiO_2$ by weight which comprises contacting sodium silicate solution with a cation exchange resin until more than the desired amount of soda goes through, then regenerating the resin and then repeating the exchange-regeneration cycles until the exchange capacity of said resin is substantially decreased, then treating the partly deactivated resin with an alkali metal hydroxide solution to reactivate the resin, said alkali metal hydroxide solution being at a temperature between about 110° F. and 180° F., then acid regenerating the resin and then again repeating the exchange-regeneration cycles until the exchange capacity of the resin is again substantially decreased.

2. A method according to claim 1 wherein the alkali metal hydroxide solution is at a temperature between about 165° F. and 180° F.

3. A method of producing silica hydrosol containing about 4% to 8% $SiO_2$ by weight which comprises contacting sodium silicate solution with a cation exchange resin until more than the desired amount of soda goes through the resin with the silica hydrosol, then regenerating the resin and then repeating the exchange-regeneration cycles a number of times until the exchange capacity of said resin is substantially decreased, then treating the partly deactivated resin with an aqueous sodium hydroxide solution having a concentration between about 5% and 15% by weight and using the sodium hydroxide solution in about ½ to 2 parts by weight per part by weight of the resin and having the sodium hydroxide solution at a temperature between about 110° and 180° F., to reactivate the resin, then washing the resin with water, then acid regenerating the resin and then again repeating the exchange-regeneration cycles a number of times until the exchange capacity of the resin is again substantially decreased and then repeating the sodium hydroxide treatment.

4. In a method of producing silica hydrosol containing about 4% to 8% $SiO_2$ by weight by contacting sodium silicate solution with a cation exchange resin until more than the desired amount of soda goes through the resin with the silica hydrosol, then regenerating the resin and then repeating the exchange-regeneration cycles a number of times until the exchange capacity of said resin is substantially decreased, the improvement which comprises revivifying the partly deactivated resin by treating it with an aqueous sodium hydroxide solution having a concentration between about 5% and 15% by weight and using the sodium hydroxide solution in about ½ to 2 parts by weight per part by weight of the resin and having the sodium hydroxide solution at a temperature between about 110° and 180° F. to reactivate the resin, then washing the resin with water, then acid regenerating the resin and then again repeating the exchange-regeneration cycles a number of times until the exchange capacity of the resin is again substantially decreased and then repeating the sodium hydroxide treatment.

References Cited in the file of this patent

UNITED STATES PATENTS 2,244,325    Bird _____ June 3, 1954

OTHER REFERENCES

Ephraim: Inorganic Chem., p. 818, Nordeman Pub. Co., N. Y. (1943).

Nachod: Ion-Exchange Academic Press, 1949, pp. 340–342.

Amberlite Monobed Deionization, pp. 8–10, June 1950, revised October 1950 (Rohm & Haas Co.), Phila., Pa.